(12) United States Patent
Wymore

(10) Patent No.: US 10,261,303 A0
(45) Date of Patent: Apr. 16, 2019

(54) METHOD AND APPARATUS FOR TRANSMISSION AND MANIPULATION OF PROGRAM DATA BY MEANS OF SPHERICAL DISPLAY

(75) Inventor: Benjamin S. Wymore, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 1187 days.

(21) Appl. No.: 09/671,603

(22) Filed: Sep. 28, 2000

(51) Int. Cl.
*H04N 5/445* (2011.01)
*G09G 5/00* (2006.01)
*G02B 21/36* (2006.01)

(52) U.S. Cl.
CPC .................................. *G02B 21/361* (2013.01)

(58) Field of Classification Search
USPC ........................ 348/51, 734, 832; 725/37–39; 345/156–169, 173–179, 810
See application file for complete search history.

(56) References Cited

U.S. PATENT DOCUMENTS

| | | | | | |
|---|---|---|---|---|---|
| 5,898,435 | A | * | 4/1999 | Nagahara et al. | 345/841 |
| 5,995,104 | A | * | 11/1999 | Kataoka et al. | 345/848 |
| 5,995,106 | A | * | 11/1999 | Naughton et al. | 345/854 |
| 6,133,911 | A | * | 10/2000 | Kim | 345/719 |
| 6,141,000 | A | * | 10/2000 | Martin | 345/178 |

* cited by examiner

*Primary Examiner* — Krista Bui

(57) ABSTRACT

A method and apparatus are provided for selecting a menu item corresponding to a program to be displayed on a video display. A projector located within a sphere-shaped object projects an image of at least one menu item onto an inside surface of the sphere-shaped object, such that the image can be seen on an outer surface of the sphere-shaped object. The sphere-shaped object is rotated to cause an image of at least one other menu item to be projected onto the inside surface of the sphere-shaped object, such that the image of at least the one other menu item can be seen on an outer surface of this sphere-shaped object. The sphere-shaped object is touched to indicate that one of the displayed menu items is selected, and a video display is cause to display images associated with the selected one of the displayed menu items.

30 Claims, 16 Drawing Sheets

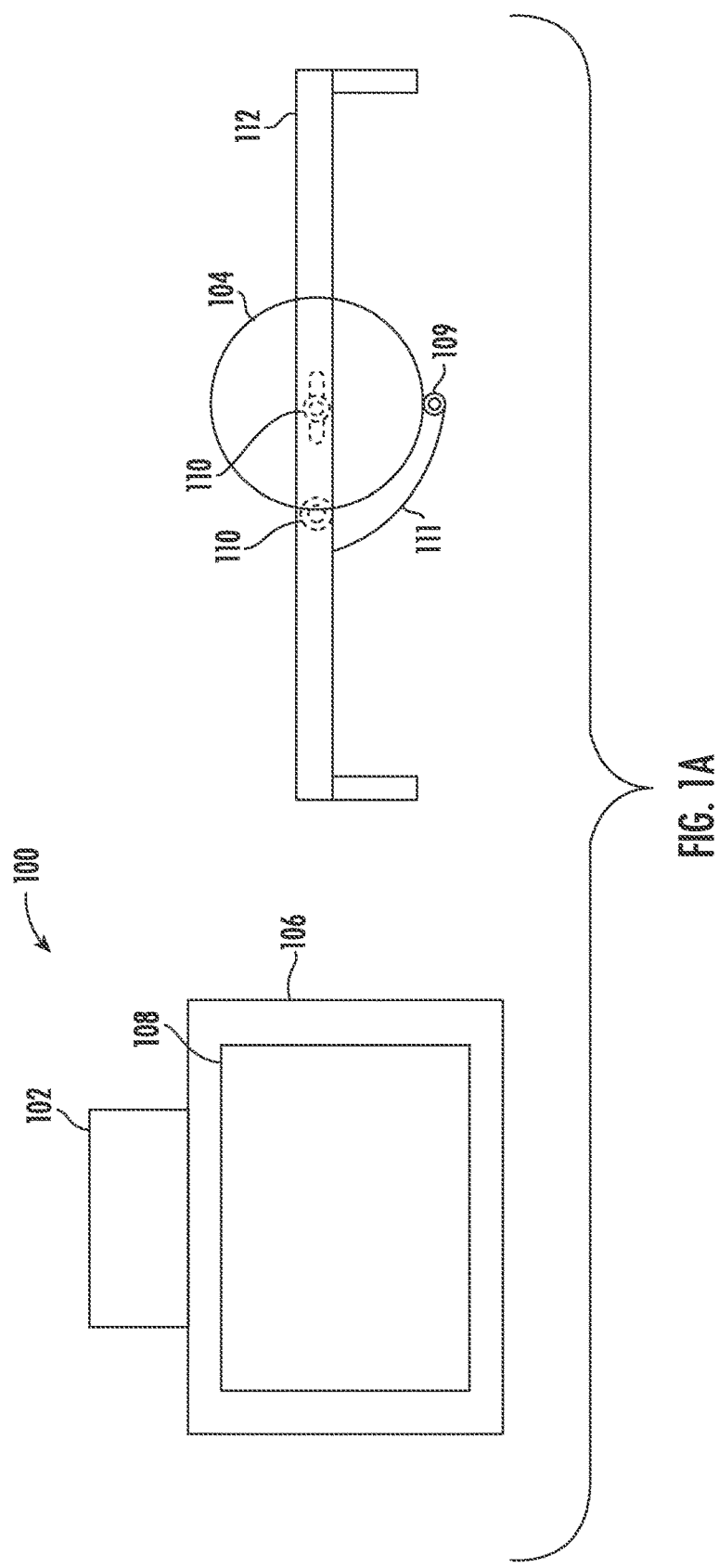

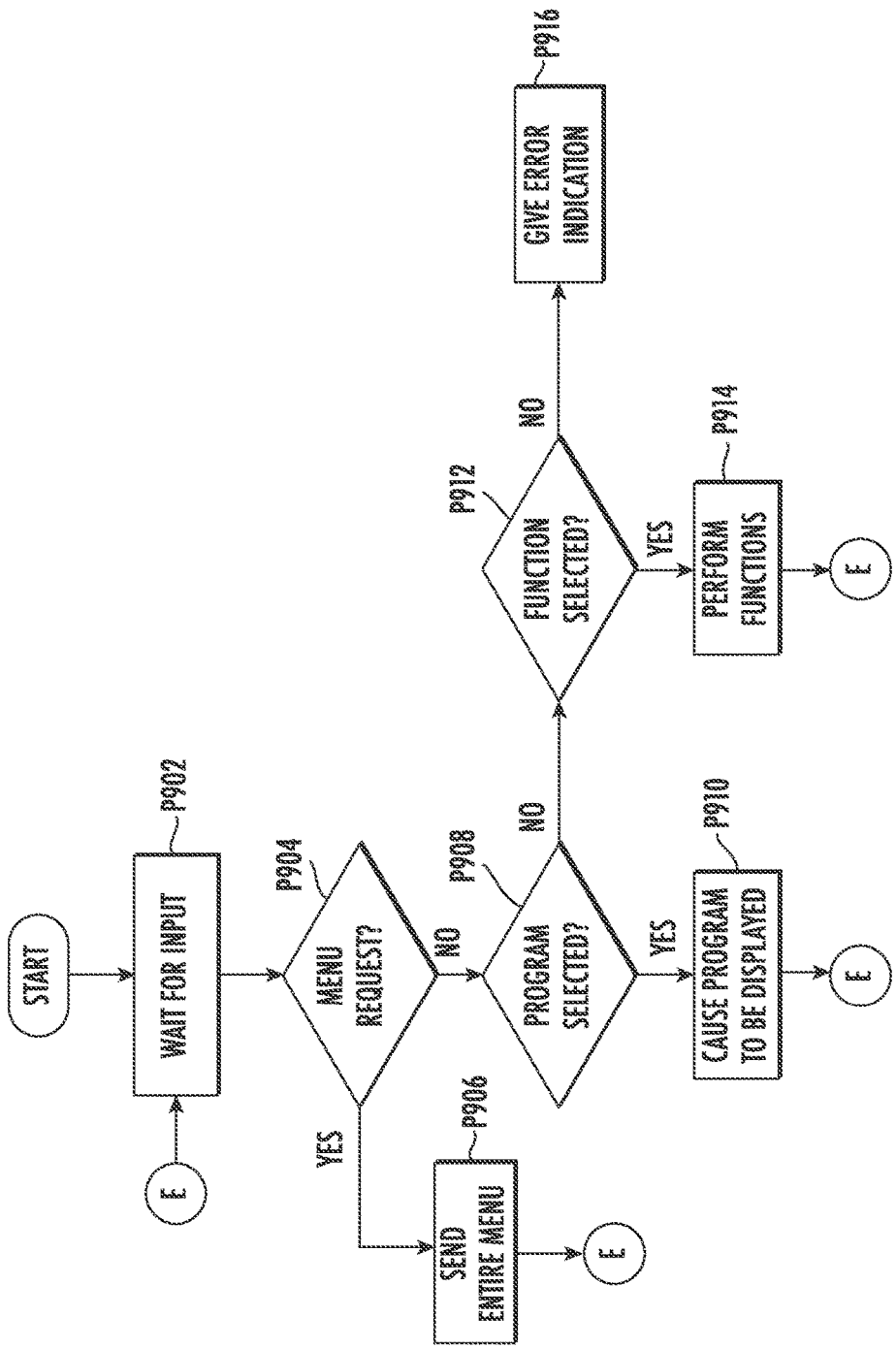

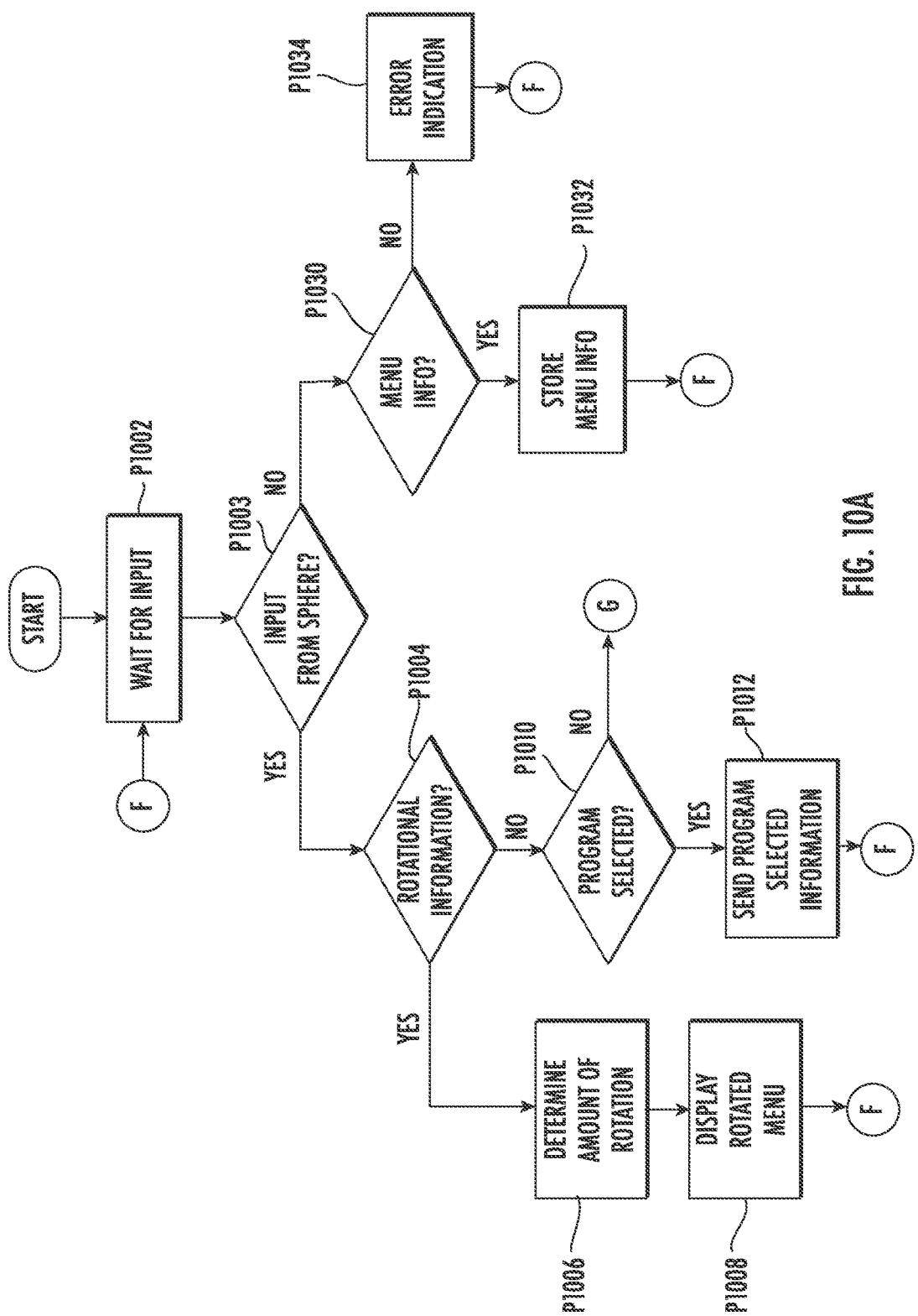

METHOD AND APPARATUS FOR TRANSMISSION AND MANIPULATION OF PROGRAM DATA BY MEANS OF SPHERICAL DISPLAY

BACKGROUND INFORMATION

1. Field of the Invention

Aspects of the invention relate to a method and apparatus for remotely selecting programs for viewing on a video display.

2. Description of Related Art

Current techniques for selecting and viewing programs do not provide for selecting and viewing in a single integrated experience. For example, current techniques do not provide for control over a display of a program guide with a physical artifact for "rolling around" a display of a large grid of shows and selecting one of the shows for viewing. A good physical mapping from a user to a program guide is needed. Current techniques provide multiple controls, with a control for moving the program guide up or down and another control for moving the program guide left or right. As a result, moving a program guide to a desired location may be cumbersome and confusing. A simple uncomplicated method is needed for moving a program guide to a desired location.

BRIEF DESCRIPTION OF THE DRAWING

Illustrative embodiments of the invention are described with reference to the following drawings in which:

FIG. 1A illustrates a system for transmitting and manipulating program data by means of a spherical display;

FIG. 9 illustrates the processing performed by the set top box a second embodiment of the invention;

FIGS. 10A–10B illustrate the processing performed by the sphere-shaped object in the second embodiment of the invention;

DETAILED DESCRIPTION

Figure 1B:
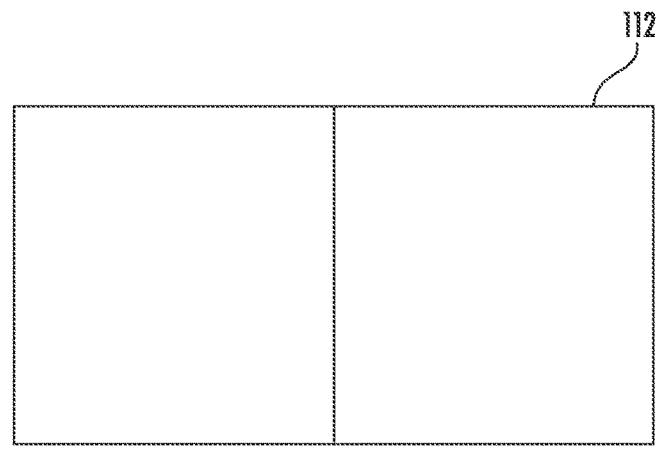
FIGS. 1B and 1C illustrate an embodiment in which the sphere-shaped object is embedded within a piece of furniture.

FIG. 1A shows a system 100 for remotely controlling the viewing of a program guide and selecting one of the programs for viewing. The system 100 comprises a set top box 102 to receive and send information to a sphere-shaped object 104. The set top box 102 may be located, for example, on top of a monitor 106 having a video display 108 for viewing programs.

The sphere-shaped object 104 may be embedded within furniture, for example, a table 112 and is configured to be in contact with rotational sensors 110. In the embodiment shown in FIG. 1A, two sensors are used, one sensor for sensing horizontal movement of the sphere-shaped object 104 and another sensor for sensing vertical movement of the sphere-shaped object 104. The sensors 110 may be, for example, the same type of sensors used to track the rotation of a ball within a computer mouse. The sensors 110 detect rotational movement of the sphere-shaped object 104 and, via a transmitter (not shown), transmit information regarding the rotational movement to the set top box 102.

In the embodiment shown in FIG. 1A, arm 111 extends from the table 112. A rolling mechanism, for example, a ball bearing mechanism 109 is mounted at an end of the arm and is in contact with the sphere-shaped object 104. The arm 111 and the ball bearing mechanism 109 provide support for the sphere-shaped object, yet allow the sphere-shaped object 104 to be freely rotated.

Figure 1C:
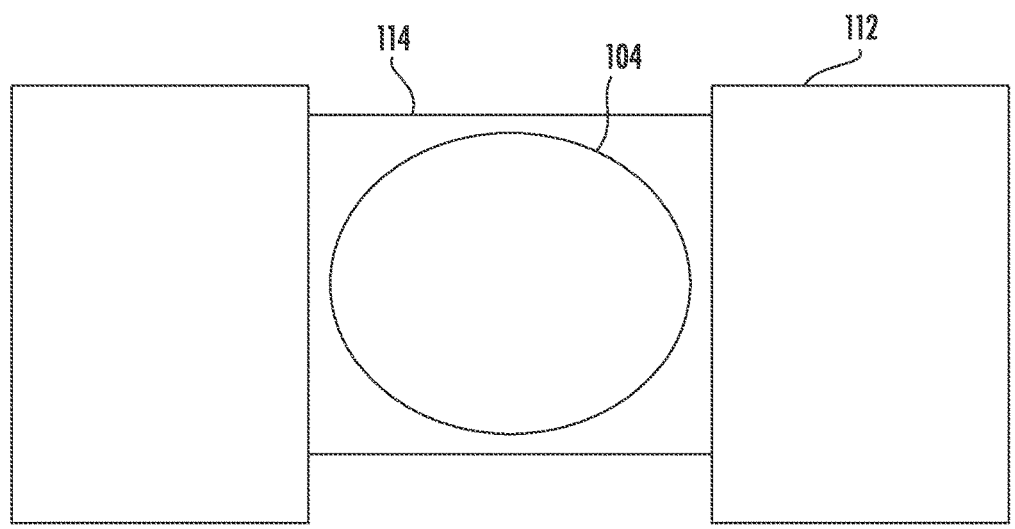

FIG. 1B shows an embodiment in which two leafs of the table 112 are closed. FIG. 1C shows the two leafs of the table 112 open with the sphere-shaped object 104 between the two opened leafs. The leafs may be opened manually or they may be configured to open via action of a motor activated, for example, by pushing a button or flipping a switch.

The sphere-shaped object 104 may be embedded within a platform 114 which may be raised after the two leafs of table 112 are opened and may be lowered when the two leafs of the table 112 are closed.

Figure 2A:
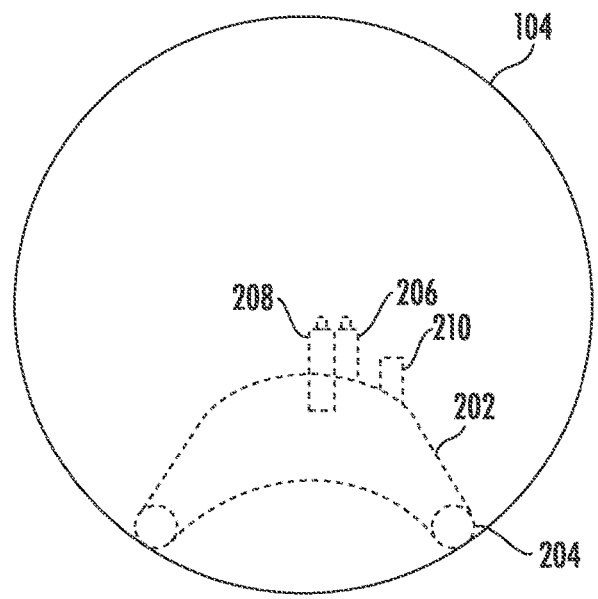
FIGS. 2A and 2B illustrate the components of the sphere-shaped object.
Figure 2B:
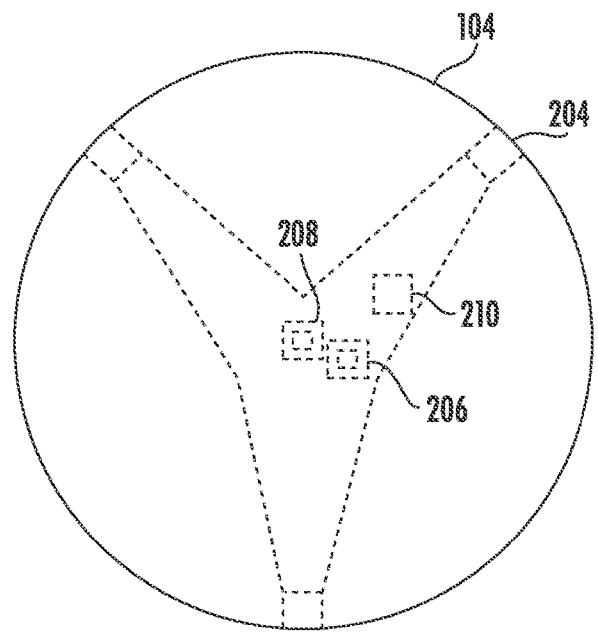

FIG. 2A shows a side view of the sphere-shaped object 104, while FIG. 2(b) shows a top view of the sphere-shaped object 104.

In this embodiment, the sphere-shaped object 104 includes a gimbaled platform 202 having rolling mechanisms 204 for keeping the gimbaled platform in a same position with respect to a user regardless of any rotation of the sphere-shaped object 104. The rolling mechanisms may each include a ball bearing mechanism to allow the rolling mechanism to roll freely in any direction on an inside surface of the sphere-shaped object.

Protruding from the gimbaled platform 202 is a projector 206 and a video sensor 208, pointing in the same direction as the projector 206. A transceiver 210 may be mounted, for example, on the gimbaled platform 204 for transmitting and receiving information to and from the set top box 102.

A surface of the sphere-shaped object 104 is constructed such that images projected by the projector 206 onto an inner surface of the sphere-shaped object 104 may be observed on an outer surface of the sphere-shaped object 104 by a user.

Figure 2C:
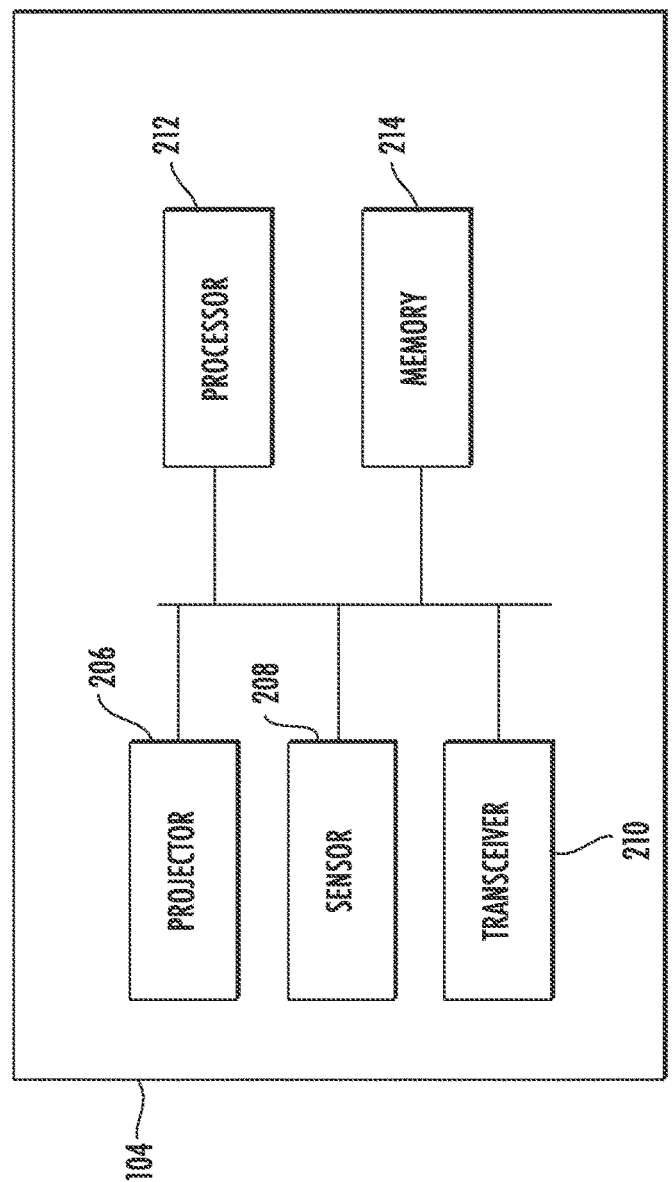
FIG. 2C is a schematic diagram showing the components of the sphere-shaped object.

FIG. 2C is a schematic diagram of the sphere-shaped object 104.

Processor 212 controls the processing within the sphere-shaped object 104.

Transceiver 210 sends and receives information to set top box 102. Information received from the set top box 102 may be stored in memory 214. Commands received may be sent to the processor 212 for processing.

Figure 3:
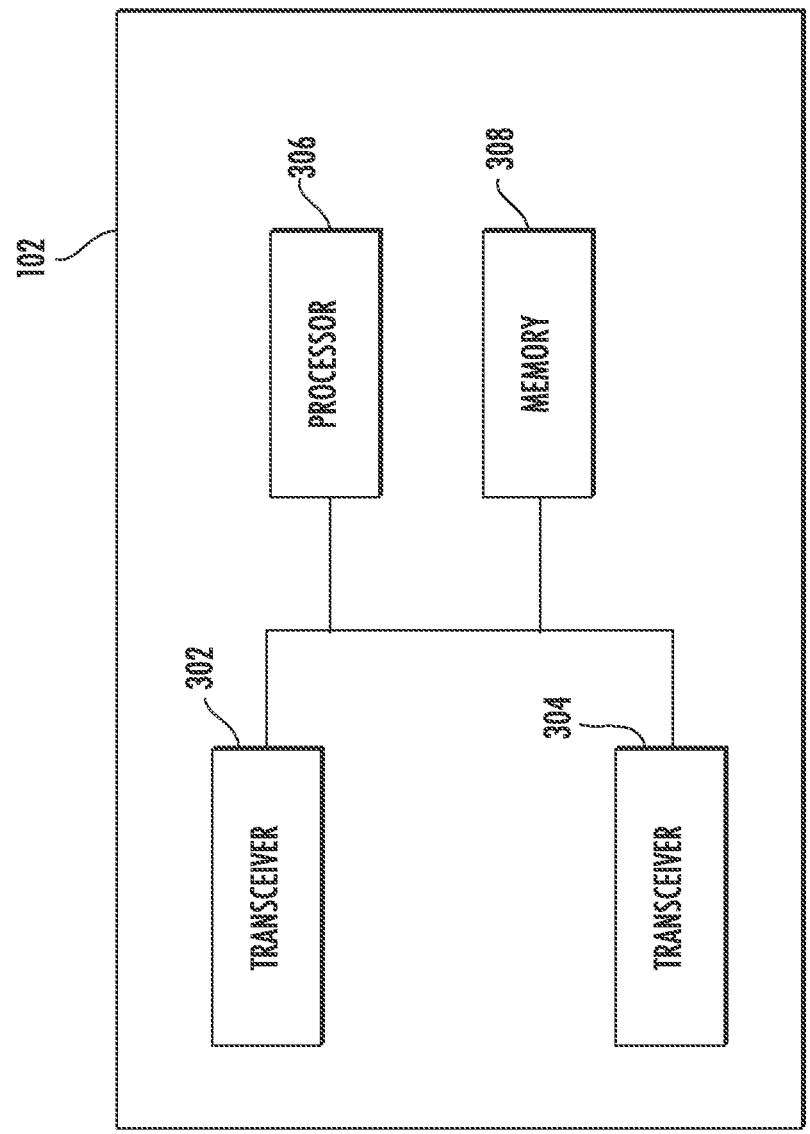
FIG. 3 is a schematic diagram illustrating the components of the set top box.

FIG. 3 shows a more detailed view of the set top box 102. The set top box 102 includes a first transceiver 302 for transmitting information to and receiving information from the sphere-shaped object 104. The set top box also includes a second transceiver 304 for transmitting information to and receiving information from a data source (not shown) which contains, for example, menu information. The first transceiver 302 may communicate with the sphere-shaped object 104 via wireless means, such as, but not limited to, radio frequency or infrared (IR) light. The second transceiver 304 may communicate with the data source via, for example, cable, such as that used to receive television broadcasts, or the second transceiver may, for example, be included in a modem which may dial a preconfigured phone number to obtain information from the data source.

The set top box 102 includes a processor 306 to process and execute any commands received from the sphere-shaped object 104 and a memory 308 to be used by the processor 306 to store information.

Figure 4:
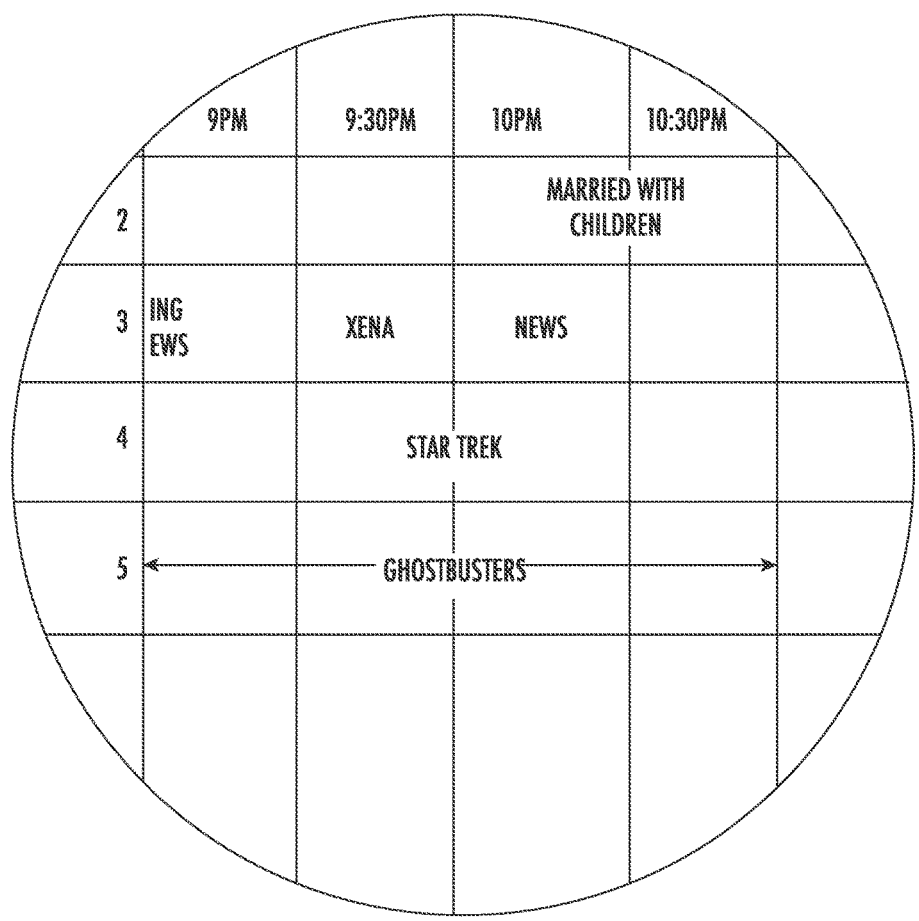
FIG. 4 illustrates a display on an outer surface of the sphere-shaped object in an embodiment of the invention.

FIG. 4 shows a view of the sphere-shaped object as would be seen by a user. The projector 206 projects menu items onto the inner surface of the sphere-shaped object 104 for viewing on the outer surface of the sphere-shaped object 104. In the embodiment shown in FIG. 4, the menu items are displayed on a grid. Along a vertical direction, program numbers are displayed. Along a horizontal direction, program times are displayed. Of course program numbers may be displayed along a horizontal direction while program times are displayed along a vertical direction.

A user selects one of the programs by touching an area of the outer surface of the sphere-shaped object 104 at which the menu data item is displayed. The touch sensor 208, which may be, for example, an infrared sensor, detects the area at which the sphere-shaped object is touched and conveys this information to the set top box via, for example, radio transmission through transceiver 210 to transceiver 302.

A user may cause the display on the sphere-shaped object 104 to rotate by rotating the sphere. The display rotates at approximately the same rate as the sphere-shaped object 104. When the sphere-shaped object 104 is rotated, the program information is updated. The channel information and the times may also be updated, but they will continue to be visible to the user. For example, rotating the sphere-shaped object 104 of FIG. 4 in an upward direction would cause the program information be updated and the channel information would indicate channels, such as channels 6, 7, 8, etc. Rotating the sphere-shaped object of FIG. 4 toward the left would cause the time information to change to, for example, 11 PM, 11:30 PM, etc.

Figure 5:
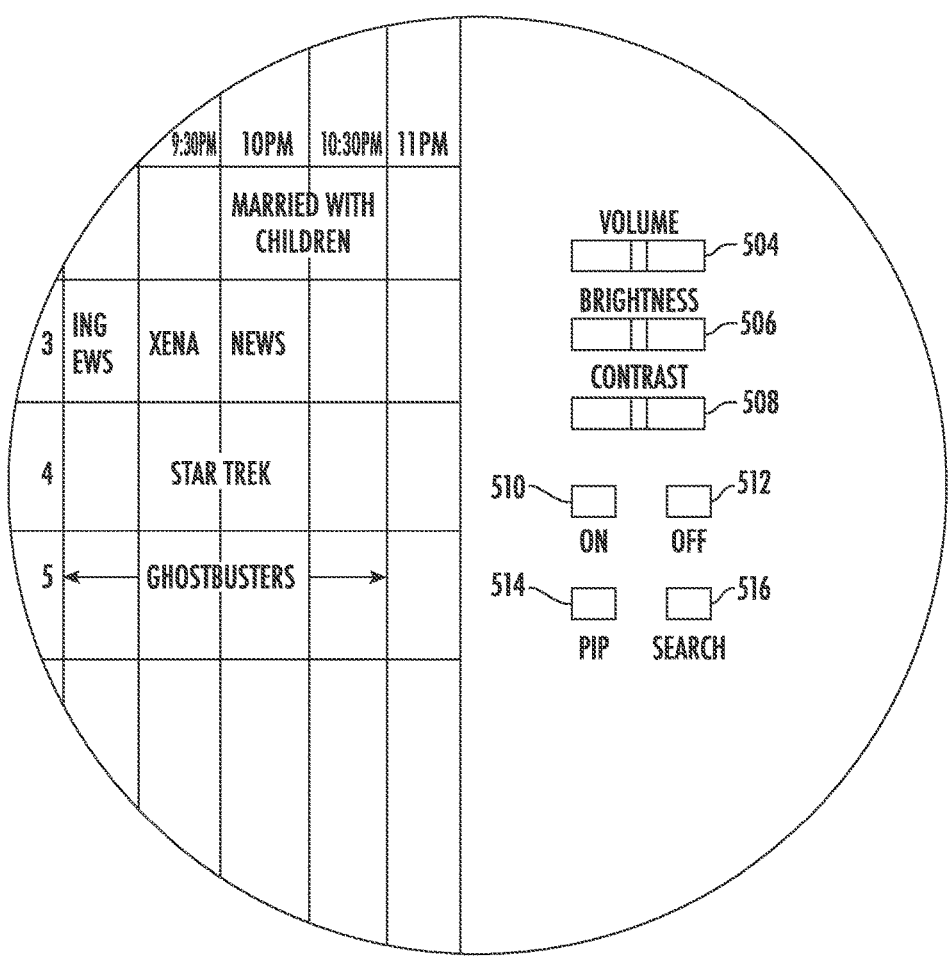
FIG. 5 illustrates a display on an outer surface of the sphere-shaped object in an embodiment of the invention.

FIG. 5 shows an embodiment of the sphere-shaped object 104 in which function keys 502 are displayed. The display projected on the sphere-shaped object 104, in this embodiment, is split in half. On a left side of the sphere-shaped object 104, the grid is displayed. On a right side of the sphere-shaped object 104, function keys are displayed. Each of the function keys may be used by a user simply by touching the outer surface of the sphere at which the image of the function is displayed.

The grid portion of the display on the sphere-shaped object 104 is used as described previously. The grid portion of the display rotates with the rotation of the sphere, while the portion of the display showing the function keys remains stationary with respect to the user.

Function keys 504, 506 and 508 correspond to volume, brightness, and contrast function keys, respectively. Each of the volume, brightness, and contrast function keys may be used by touching each respective function key. Touching the function key, for example, on a right portion causes the respective control, volume, brightness or contrast to be increased. Touching the respective function keys, for example, on a left portion of the function key causes the respective control, volume, brightness or contrast to be decreased. Of course other methods of increasing or decreasing each function may also be used.

Function keys 510 and 512 correspond to an on and off function, respectively. Touching function key 510 causes a command to be sent to the set top box 102 to turn on an associated monitor 106. Touching function key 512 causes a command to be sent from the sphere-shaped object 104 to the set top box 102 to cause the associated monitor 106 be powered off.

Function key 514 corresponds to a picture-in-picture (PIP) function. By touching the area corresponding to the PIP key and then touching a program, the user causes a command to be sent to the set top box 112 to cause the selected program to be viewed in a small picture on a video display while the remainder of the picture of the video display displays an already playing program.

Figure 6:
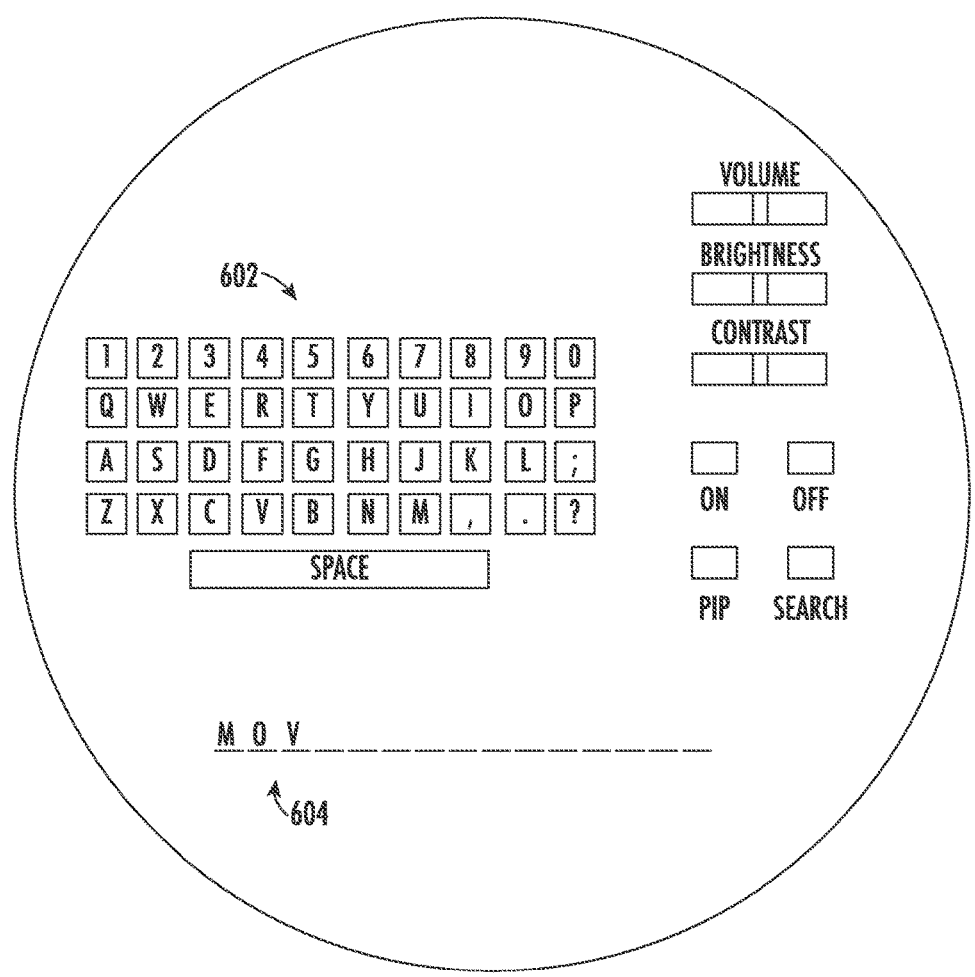
FIG. 6 illustrates a display showing an input device for entering textual data via the sphere-shaped object.

By touching an area corresponding to a search key 516 a search function is performed. When the search function is initiated, in this embodiment, a keyboard display 602, as seen in FIG. 6, will be displayed on an outer surface of the sphere-shaped object 104 by the projector 206 displaying an image of a keyboard on an inner surface of the sphere-shaped object 104. The user may enter text by touching a key, corresponding to a letter, number, punctuation or space on the keyboard 602. As each key is touched, the corresponding letter may be displayed in a text display area 604.

After entering the desired text, the user again touches an area corresponding to the search key and a command is sent from the sphere-shaped object 104 to the set top box 102 to cause the set top box 102 to search the menu items for an occurrence of the entered text. When the text is found, that portion of the display of menu items will be displayed on the outer surface of the sphere-shaped object 104.

Figure 7A:
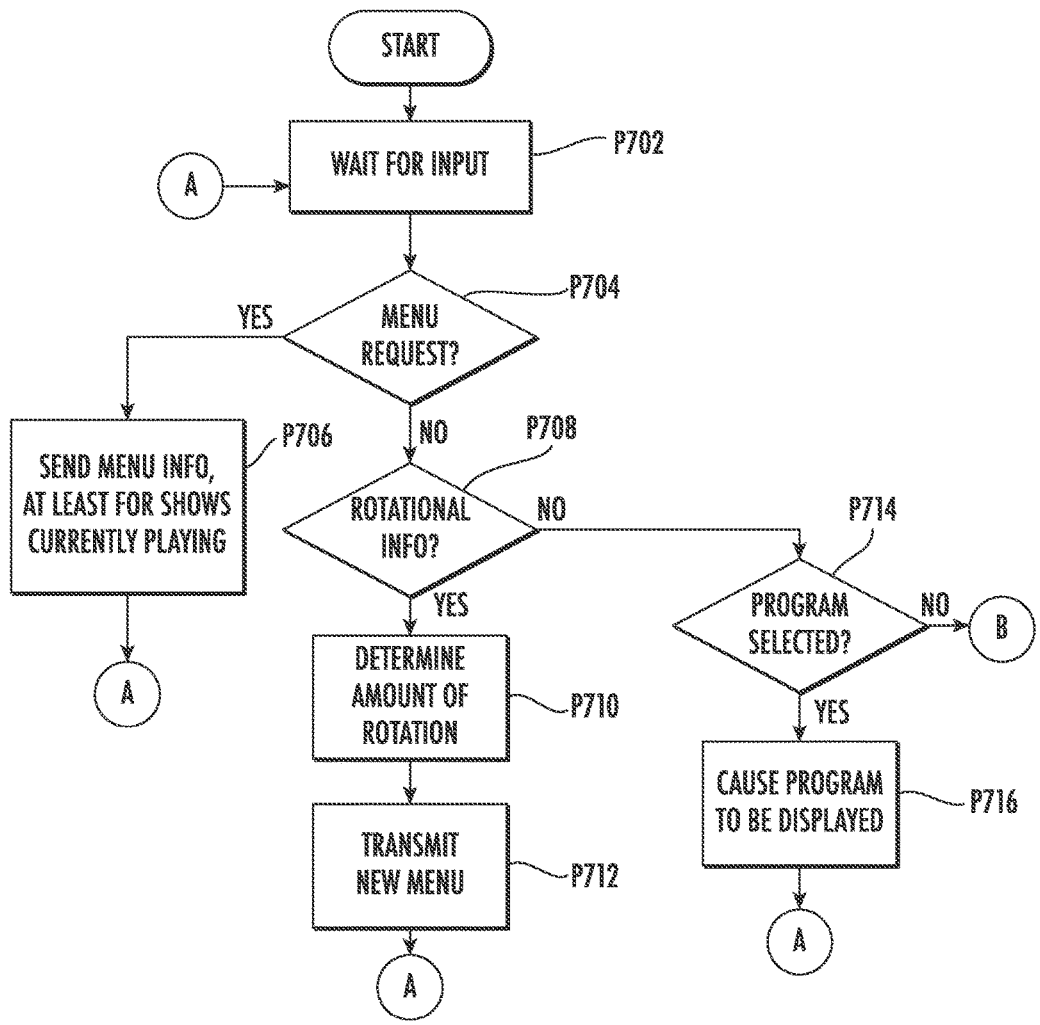
FIGS. 7A–7B show the processing performed by the set top box in a first embodiment of the invention.
Figure 7B:
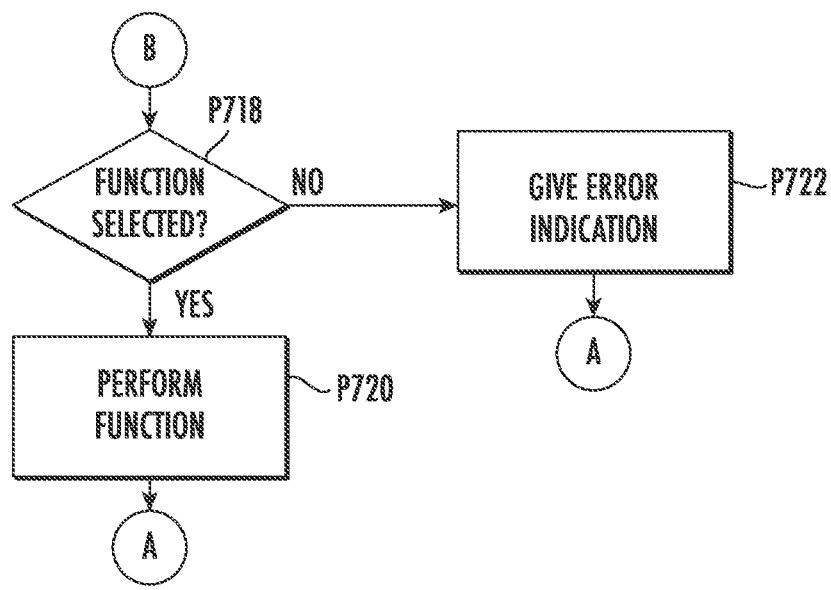

FIGS. 7A and 7B illustrate processing performed in the set top box 102 in a first embodiment of the invention. At P702, the process waits for input associated with the sphere-shaped object 104. Once input is received, at P704 a determination is made as to whether a menu request was received.

If a menu request was received, P706 is executed to cause menu information, for at least shows that are currently playing, to be sent to the sphere-shaped object and control is returned to P702 to wait for additional input.

At P704, if it is determined that a menu request was not received, a check will be made at P708 to determine whether rotational information associated with the sphere-shaped object 104 is received.

If it is determined that rotational information has been received, P710 is executed to determine an amount of rotation of the sphere-shaped object and at P712 new menu information is transmitted to the sphere-shaped object, the portion of the menu information to be displayed being determined by an amount of the rotation of the sphere-shaped object. The display on the sphere-shaped object 104 is rotated and updated such that the display on the sphere-shaped object 104 rotates at approximately a same rate as the rotation of the sphere-shaped object 104. As the sphere-shaped object 104 is rotated in one direction, for example, to the left, later times and corresponding shows are displayed on the newly displayed portion of the display on the right. As the sphere-shaped object 104 is rotated in another direction, for example, to the right, earlier times and corresponding shows are displayed on the left. Following the transmittal of the menu information, control is returned to P702 to wait for additional input.

If, at P708, it is determined that rotational information was not received, then at P714 a check is made to determine whether information regarding a selected program is received.

If information regarding a selected program is received, P716 will be executed to cause the program to be displayed on the monitor 106 by selecting an appropriate channel for viewing. Control is then returned to P702 to wait for additional input.

If at P714 it is determined that the input does not pertain to a selected program, then P718 is executed to determine whether a function was selected. If a function was selected, P720 is executed to perform the function and then control returns to P702 to wait for additional input.

If at P718 it is determined that a function wasn't selected, then P722 is executed to provide an error indication. Such an error indication may be, for example, a text message on the video display, a tone, or an error indication light blinking on the set top box 102.

Figure 8A:
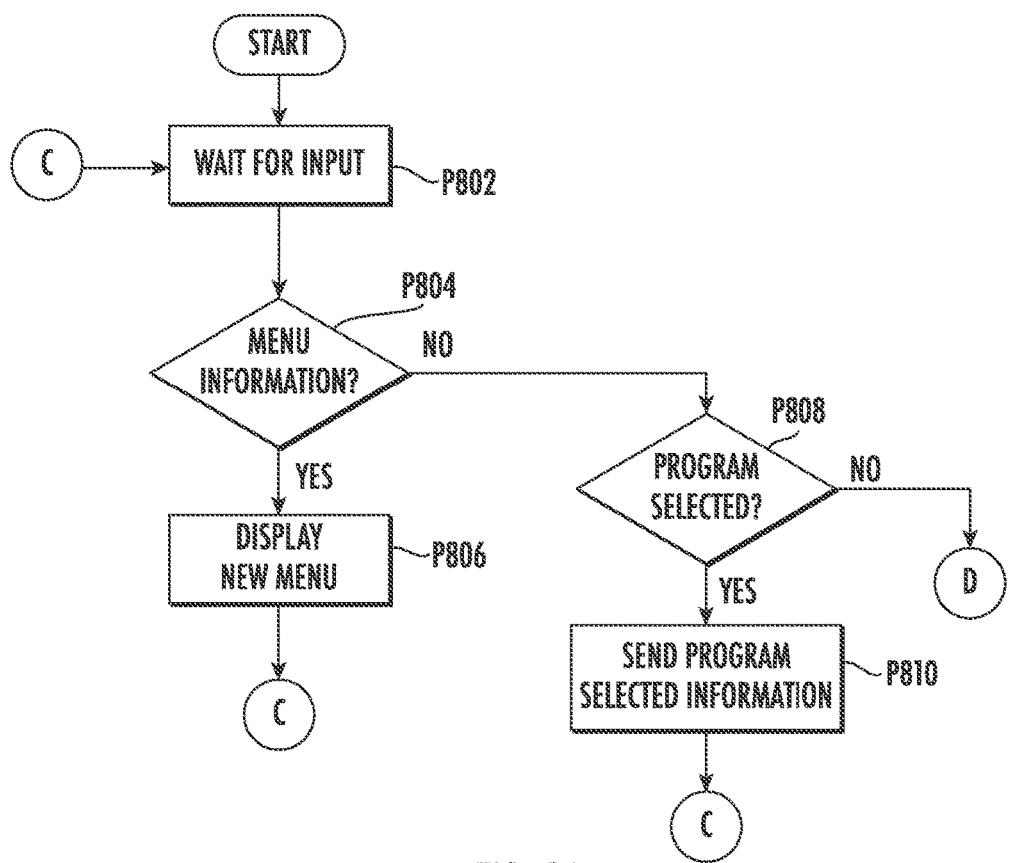
FIGS. 8A–8B show the processing performed by the sphere-shaped object in the first embodiment of the invention.
Figure 8B:
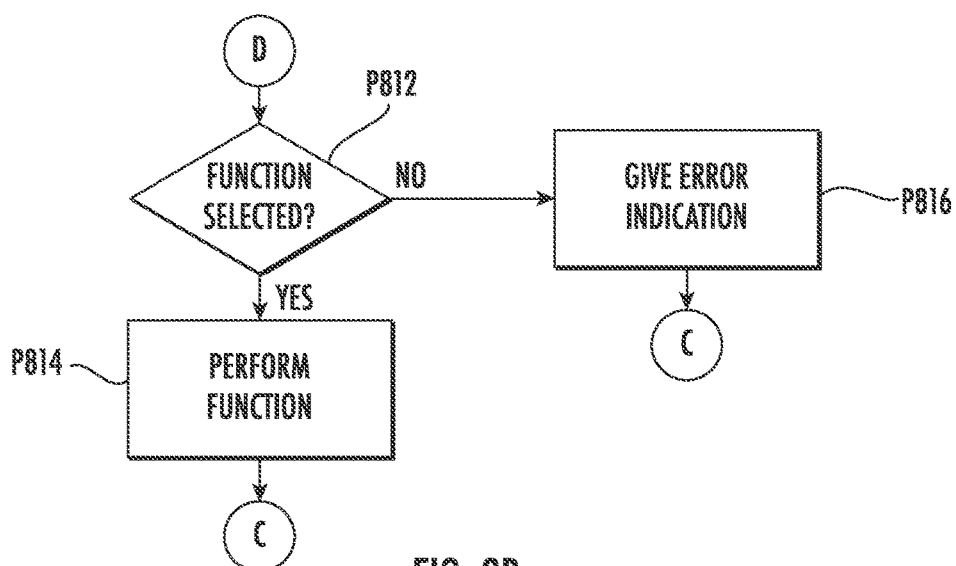

FIGS. 8A and 8B illustrate the processing within the sphere-shaped object in a first embodiment of the invention.

At P802 the sphere-shaped object 104 waits for input either from the set top box 102 or from a user.

At P804, a determination is made to determine whether the input is menu information from the set top box. If the input is menu information, P806 is executed to cause the new menu information to be displayed on the surface of the sphere-shaped object 104 by use of the projector 206 within the sphere-shaped object.

If, at P804, it is determined that menu information was not received, then P808 is executed to determine whether selected program information was received by a user touching a display of a menu item on the surface of the sphere-shaped object 104.

If selected program information was received, P810 is executed to send the selected program information to the set top box 102.

If, at P808, it is determined that selected program information was not received, then P812 is executed to determine whether a function had been selected.

If a function was selected, P814 is executed to perform the selected function, otherwise P816 is executed to give an error indication. The error indication may be, for example, a tone sounded by the sphere-shaped object 104, or an error message displayed on an outer surface of the sphere-shaped object. Control is then returned to P802 to wait for additional input.

FIG. 9 illustrates the processing within the set top box 102 in a second embodiment of the invention.

At P902, the set top box 102 waits for input from the sphere-shaped object 104.

At P904, a determination is made as to whether the input is a menu request from the sphere-shaped object 104.

If the input is a menu request, P906 is executed to cause the entire menu stored on the set top box to be transmitted to the sphere-shaped object 104. Control then returns to P902 to wait for additional input.

If, at P904, it is determined that a menu request was not received, then P908 is executed to determine whether a program was selected from the sphere-shaped object.

If a program was selected from the sphere-shaped object, P910 is performed to cause the program to be displayed on the video display by selecting the appropriate channel for viewing the program. Control then returns to P902 to wait for additional input.

If, at P908, it is determined that a program was not selected, then P912 is performed to determined whether a function was selected by the user.

If a function was selected, then P914 is executed to determine which function was selected and to perform that function. Control then returns to P902 to wait for additional input.

If, at P912, it is determined that a function was not selected, then an error indication is provided by, for example, any of the methods previously mentioned.

Figure 10B:
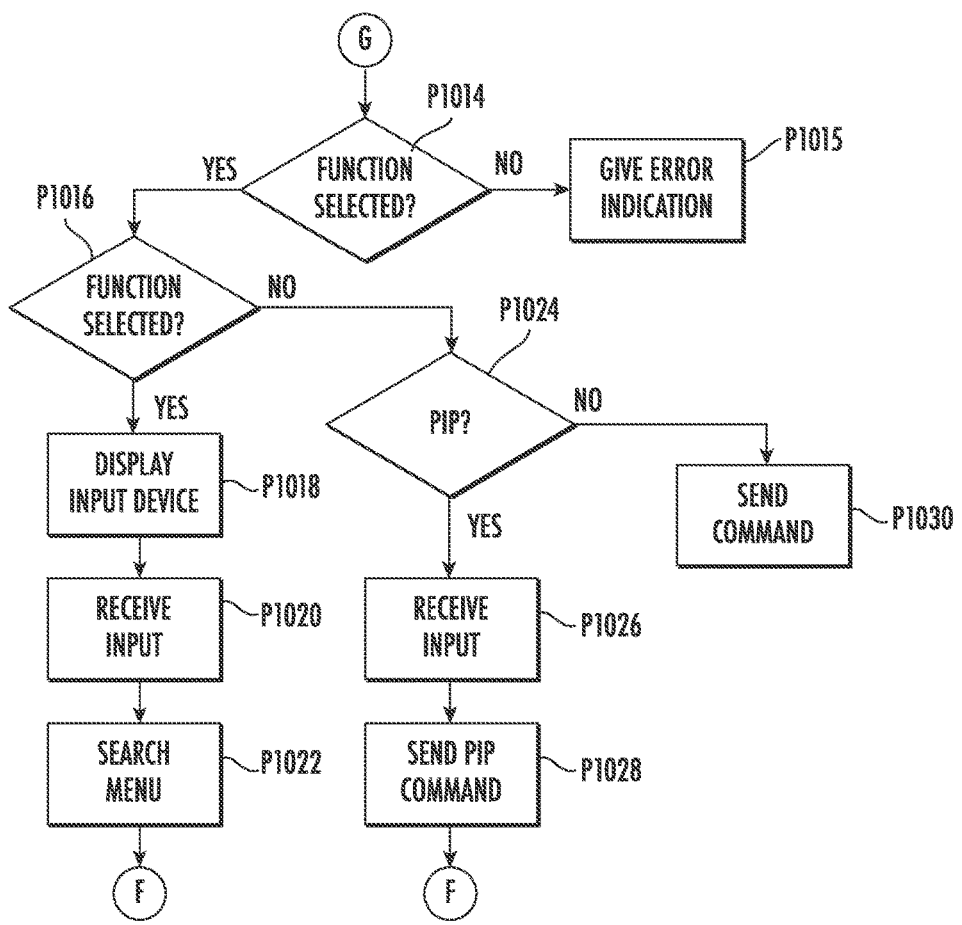

FIG. 10A illustrates the processing within the sphere-shaped object 104 in the second embodiment of the invention.

At P1002, the sphere-shaped object 104 waits for input initiated by a user.

At P1003, a check is made to determine whether the input is from the sphere-shaped object 104. If the input is from the sphere-shaped object 104 then P1004 will be performed.

At P1004, it is determined whether the input is rotational information derived by a user causing the sphere-shaped object 104 to rotate.

If the information is rotational information, at P1006, an amount of rotation is determined and at P1008 the menu is displayed, but is offset by an amount corresponding to an amount of rotation. The display on the sphere-shaped object 104 rotates at approximately the same rate of rotation as the sphere-shaped object 104. Control then returns to p1002 to wait for additional input.

If, at P1004, it is determined that the input is not rotational information, then at P1010, a check is made to determine whether the input is selected program information.

If the input is selected program information, P1012 is executed to send the selected program information to the set top box 102. Control is then returned to P1002 to wait for additional input.

If at P1010 it is determined that the input received is not selected program information, then P1014 is executed to determine whether the user selected a function.

If a function was selected, P1016 is executed to determine whether the function is a search function.

If the function is a search function, then at P1018, an input device, for example, a keyboard is projected by projector 206 onto an inner surface of the sphere-shaped object 104, and subsequently onto an outer surface of the sphere-shaped object 104. At P1020, sensor 208 determines the input selected by the user by sensing an area corresponding to the input at which the user touched the sphere-shaped object 104. When the user has completed entering text, the user indicates that no further text will be entered by, for example, touching an area corresponding to the search key on the outer surface of the sphere-shaped object 104.

At P1022, the processor 306 searches memory 308 for an occurrence of the text within the menu information and if found causes a portion of the menu containing the search text to be displayed on an outer surface of the sphere-shaped object 104 via use of the projector 206. Control then returns to P1002 to wait for additional input.

If at P1016, it is determined that the function selected is not a search function, then at P1024 a determination is made as to whether the selected function is a picture-in-picture (PIP) function.

If the function selected is determined to be the PIP function, then P1026 is executed to receive the input which is a program selected from the menu by a user touching the display of the menu item on the surface of the sphere-shaped object 104. At P1028, the function key information corresponding to PIP and the selected program information is transmitted to the set top box 102 so that the set top box 102 can cause the selected program to be displayed on a small picture located within the display area of the monitor 106.

If at P1024, it is determined that the PIP function key was not selected, then the command is sent to the set top box to be performed.

If, at P1014, it is determined that a function was not selected, the P1015 is performed to provide an error indication by, for example, using any of the methods mentioned above.

If, at P1003, it is determined that the input is not from the sphere-shaped object 104, then it must be from the set top box 102.

At P1030 a check is made to determine whether the received input was menu information and if so, the menu information is stored in, for example, memory 214 and control is returned to p1002 to wait for additional input.

If, at P1030, the check determines that menu information was not received, then, at P1034, an error indication is provided by, for example, any of the methods mentioned above and control is returned to P1002 to wait for additional input.

Figure 11:
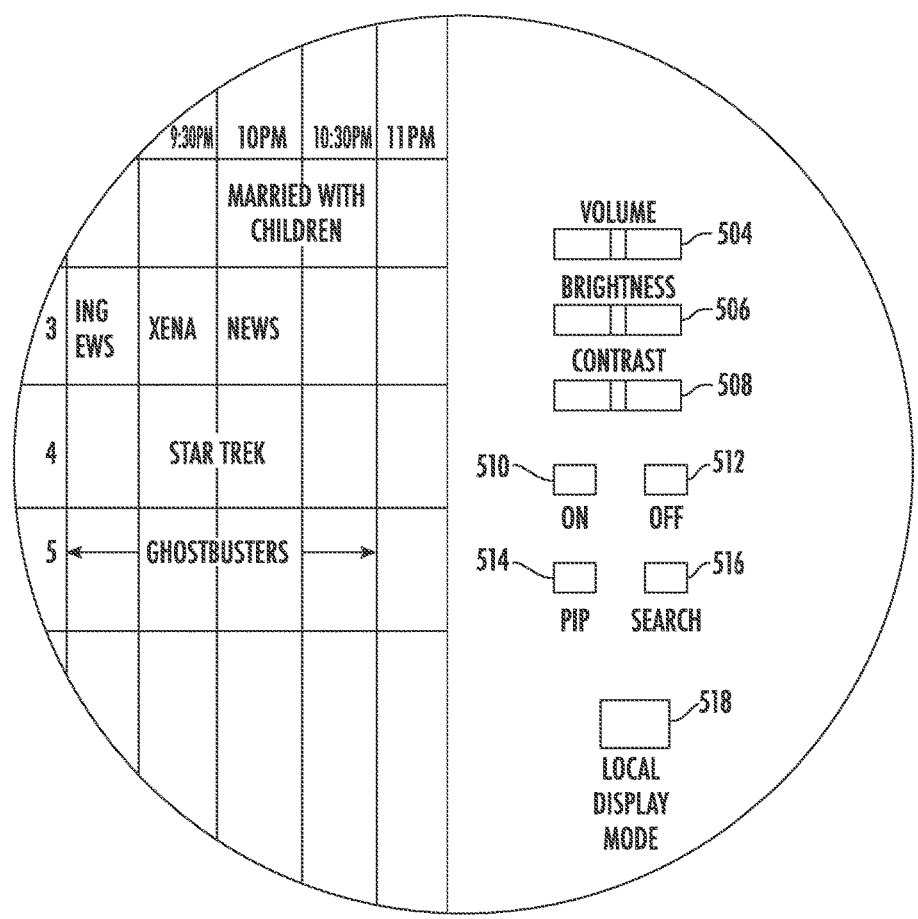
FIG. 11 illustrates a menu display, having a local display mode option.

FIG. 11 illustrates an optional feature 518 which can be included in any of the above described embodiments.

Function key 518 is a "local display mode" key. When sensor 208 senses that the user has touched this key, a command is sent to the set top box 102 and "local display mode" is entered.

Figure 12:
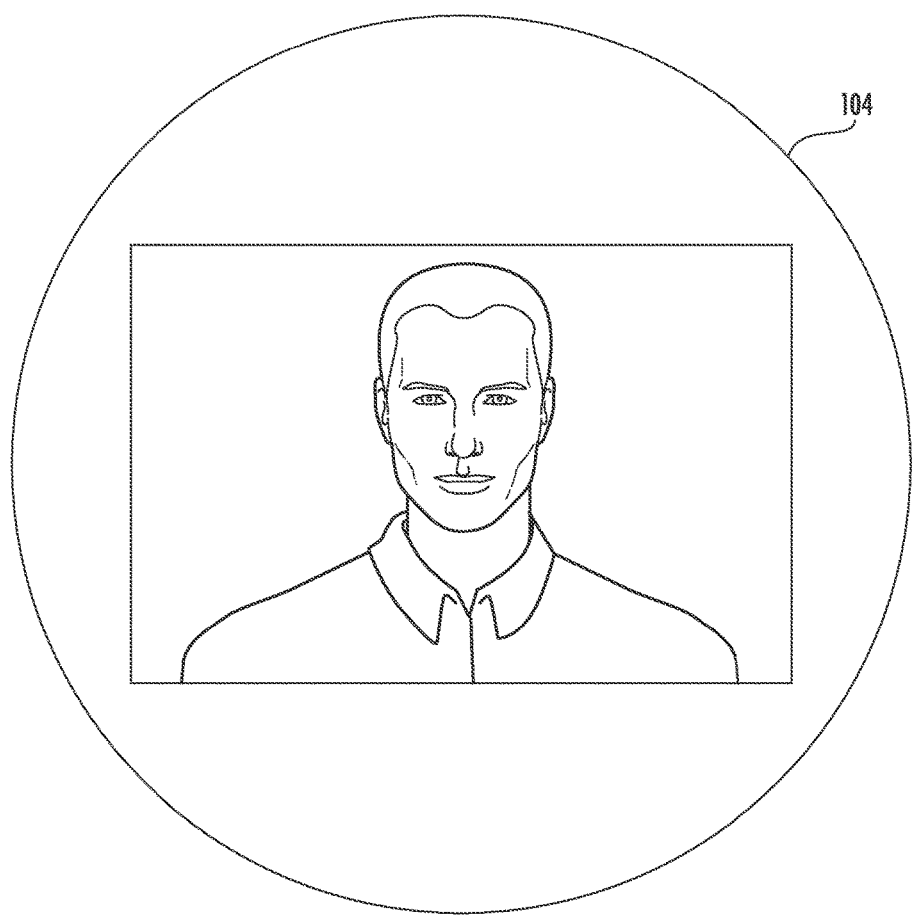
FIG. 12 shows a program being displayed on the outer surface of the sphere-shaped object.

In "local display mode", the set top box 102 causes a program to be transmitted to the sphere-shaped object 104. The program is then displayed on the sphere-shaped object 104 via projector 206. See FIG. 12. To return back to "normal mode" a user may, for example, touch the sphere-shaped object 104 at any location. This would result in, for example, the sphere-shaped object 104 showing a display as illustrated in FIG. 11.

While the invention has been described by way of example embodiments, it is understood that the words which have been used herein are words of description, rather than words of limitation. Changes may be made within the purview of the appended claims, without departing from the scope and spirit of the invention in its broader aspects. Although the invention has been described herein with reference to particular means, materials, and embodiments, it is understood that the invention is not limited to the particulars disclosed. The invention extends to all equal constructions, means, and uses which are within the scope of the appended claims.

What is claimed is:

1. A method comprising:
    projecting, from a projector located within a sphere-shaped object, an image of at least one menu item onto an inside surface of the sphere-shaped object, such that the image can be seen on an outer surface of the sphere-shaped object;
    rotating the sphere-shaped object to cause an image of at least one other menu item to be projected onto the inside surface of the sphere-shaped object, such that the image of at least the one other menu item can be seen on an outer surface of the sphere-shaped object;
    touching the sphere-shaped object to indicate that one of the displayed menu items is selected; and
    causing a video display to display images associated with the selected one of the displayed menu items.

2. The method of claim 1, wherein:
    each of the menu items represents a program for viewing on the video display, and
    the video display is a television.

3. The method of claim 1, wherein:
    each of the menu items represents a program for viewing on the video display, and
    the video display is formed on the outer surface of the sphere-shaped object when the projector projects the images associated with the selected one of the displayed menu items onto the inner surface of the sphere-shaped object.

4. The method of claim 1, further comprising:
    projecting an image of a function key onto the inner surface of the sphere-shaped object, such that the image of the function key can be seen on the outer surface of the sphere-shaped object;
    selecting a function by touching the sphere-shaped object at a location on the outer surface of the sphere-shaped object where the image of the function key appears; and
    performing the selected function.

5. The method of claim 4, wherein the function comprises one of volume control, brightness control, contrast control, picture-in-picture, power on, power off and search.

6. The method of claim 4, further comprising:
    projecting an image of an input device onto the inner surface of the sphere-shaped object, such that the image of the input device can be seen on the outer surface of the sphere-shaped object; and
    entering input by touching the outer surface of the sphere at a location at which the image of the input device appears.

7. The method of claim 6, wherein the image of the input device is an image of a keyboard and a user enters input by touching the sphere-shaped object at a point on the outer surface of the sphere-shaped object at which an image of a key of the keyboard appears.

8. The method of claim 4, wherein the image of the function key remains stationary on the outer surface of the sphere-shaped object, in relation to a user of the sphere-shaped object, regardless of any rotational movement of the sphere-shaped object.

9. The method of claim 8, wherein the image of the input device remains stationary on the outer surface of the sphere-shaped object, in relation to a user of the sphere-shaped object, regardless of any rotational movement of the sphere-shaped object.

10. An apparatus comprising:
    a sphere-shaped object;
    a projector and a touch sensor located within the sphere-shaped object;
    at least one rotational sensor mounted in contact with the sphere-shaped object so as to sense a rotational movement of the sphere-shaped object and an amount of the rotational movement of the sphere-shaped object;
    a first transmitter to transmit rotational data from the at least one rotational sensor;
    a second transmitter to transmit touch sensor data from the touch sensor; and
    a receiver to receive display data from a remote unit and to forward the display data to the projector to project the display data on an inside surface of the sphere-shaped object, such that the image can be seen on an outside surface of the sphere-shaped object.

11. The apparatus of claim 10, wherein the projector and the touch sensor are gimbaled such that the projector and the touch sensor always point in a same direction relative to a user, regardless of any rotational movement of the sphere-shaped object.

12. The apparatus of claim 10, wherein the touch sensor is an infrared sensor.

13. The apparatus of claim 10, wherein:
the projector is arranged to display an image of at least one menu item onto the inside surface of the sphere-shaped object, such that the image can be seen on the outer surface of the sphere-shaped object, and
the touch sensor is arranged to sense a position on the outer surface of the sphere-shaped object at which the outer surface is touched.

14. The apparatus of claim 13, wherein each of the menu items represents a program for viewing on a video display.

15. The apparatus of claim 14, wherein the video display is a television monitor.

16. The apparatus of claim 14, wherein the video display is formed, by the projector, on the outer surface of the sphere-shaped object when the projector projects images associated with a selected one of the displayed menu items onto the inner surface of the sphere-shaped object.

17. The apparatus of claim 16, wherein the touch sensor senses that a user selected one of the displayed menu items by determining that the user touched an image of the selected one of the displayed menu items appearing on the outer surface of the sphere-shaped object.

18. The apparatus of claim 13, wherein a user selects a function when the projector projects an image of a function key on the inside surface of the sphere-shaped object, such that the image of the function key can be seen on the outside surface of the sphere-shaped object, and the touch sensor senses that the image of the function key has been touched.

19. The apparatus of claim 13, wherein a user enters input when the projector projects an image of an input device on the inside surface of the sphere-shaped object, such that the image of the input device can be seen on the outside surface of the sphere-shaped object, and the touch sensor senses that the image of the input device has been touched.

20. The apparatus of claim 19, wherein the image of the input device is an image of a keyboard and the touch sensor senses that the sphere-shaped object has been touched on a point on the outer surface of the sphere-shaped object at which an image of a key of the keyboard appears.

21. A system comprising:
a remote unit;
a sphere-shaped object;
a projector and a touch sensor located within the sphere-shaped object;
at least one rotational sensor mounted in contact with the sphere-shaped object so as to sense a rotational movement of the sphere-shaped object and an amount of the rotational movement of the sphere-shaped object;
a first transmitter to transmit rotational data from the at least one rotational sensor to the remote unit;
a second transmitter to transmit touch sensor data from the touch sensor to the remote unit; and
a receiver to receive display data from the remote unit and to forward the display data to the projector to project the display data on an inside surface of the sphere-shaped object, such that the image can be seen on an outside surface of the sphere-shaped object;
the remote unit comprising:
a receiver for receiving the rotational data and the touch sensor data;
a transmitter to transmit the at least one menu item to the receiver associated with the sphere-shaped object;
a storage device to store a plurality of menu items;
a second transmitter to request the menu data items from a data source; and
a processor to process information from the first and the second transmitters associated with the sphere-shaped object and to prepare a response for sending to the sphere-shaped object.

22. The system of claim 21, wherein the projector and the touch sensor are gimbaled such that the projector and the touch sensor always point in a same direction relative to a user, regardless of any rotational movement of the sphere-shaped object.

23. The system of claim 22, wherein:
the projector is arranged to display an image of at least one menu item onto the inside surface of the sphere-shaped object, such that the image can be seen on the outer surface of the sphere-shaped object, and
the touch sensor is arranged to sense a position on the outer surface of the sphere-shaped object at which the outer surface is touched.

24. The system of claim 23, wherein each of the menu items represents a program for viewing on a video display.

25. The system of claim 24, wherein the video display is a television monitor.

26. The system of claim 24, wherein the video display is formed, by the projector, on the outer surface of the sphere-shaped object when the projector projects images associated with a selected one of the displayed menu items onto the inner surface of the sphere-shaped object.

27. The system of claim 26, wherein the touch sensor senses that a user selected one of the displayed menu items by determining that the user touched an image of the selected one of the displayed menu items appearing on the outer surface of the sphere-shaped object.

28. The system of claim 22, wherein a user selects a function when the projector projects an image of a function key on the inside surface of the sphere-shaped object, such that the image of the function key can be seen on the outside surface of the sphere-shaped object, and the touch sensor senses that the image of the function key has been touched.

29. The system of claim 22, wherein a user enters input when the projector projects an image of an input device on the inside surface of the sphere-shaped object, such that the image of the input device can be seen on the outside surface of the sphere-shaped object, and the touch sensor senses that the image of the input device has been touched.

30. The system of claim 21, wherein the touch sensor is an infrared sensor.

* * * * *